United States Patent
Takayama

(10) Patent No.: US 8,717,603 B2
(45) Date of Patent: May 6, 2014

(54) SYSTEM AND METHOD FOR AUTOMATIC EXECUTION OF PRINT INSTRUCTIONS STORED ON EXTERNAL MEMORY

(75) Inventor: Hideaki Takayama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 425 days.

(21) Appl. No.: 13/094,441

(22) Filed: Apr. 26, 2011

(65) Prior Publication Data

US 2012/0140266 A1    Jun. 7, 2012

(30) Foreign Application Priority Data

Dec. 7, 2010  (JP) ................................ 2010-272418

(51) Int. Cl.
*G06K 15/02* (2006.01)
*G06F 15/16* (2006.01)

(52) U.S. Cl.
USPC .......... 358/1.15; 358/1.16; 358/403; 358/444

(58) Field of Classification Search
USPC ............... 358/1.1, 1.15, 1.16, 1.17, 400, 401, 358/403, 444
See application file for complete search history.

(56) References Cited

U.S. PATENT DOCUMENTS

2006/0132841 A1*  6/2006  Park et al. ................... 358/1.15
2009/0021789 A1*  1/2009  Sugimoto ................... 358/1.16

FOREIGN PATENT DOCUMENTS

| JP | 2005-012443 A | 1/2005 |
| JP | 2006-011807 A | 1/2006 |
| JP | 2008-186300 A | 8/2008 |

* cited by examiner

*Primary Examiner* — Thomas D Lee
(74) *Attorney, Agent, or Firm* — Sughrue Mion, PLLC

(57) ABSTRACT

An image forming apparatus includes an external storage device insertion detecting section that detects that an external storage device is inserted. The image forming apparatus further includes an identification information generating section that generates identification information to identify the corresponding image information from the image information generated page by page by an image information generating section; an identification information comparing section that acquires previous identification information, which is previously generated by the identification information generating section, and that compares the acquired previous identification information with the identification information generated by the identification information generating section; and a printing executing section that executes a printing process for the image information corresponding to the generated identification information if a result of the comparison by the identification information comparing section indicates that the generated identification information does not match the previous identification information.

9 Claims, 5 Drawing Sheets

US 8,717,603 B2

SYSTEM AND METHOD FOR AUTOMATIC EXECUTION OF PRINT INSTRUCTIONS STORED ON EXTERNAL MEMORY

CROSS-REFERENCE TO RELATED APPLICATION

This application is based on and claims priority under 35 USC 119 from Japanese Patent Application No. 2010-272418 filed on Dec. 7, 2010.

BACKGROUND

1. Technical Field

The present invention relates to an image forming apparatus, computer readable medium, and an image forming system.

2. Related Art

Techniques for reading only particular information from information stored in a mounted external storage device and performing a printing process for the read information have been proposed.

SUMMARY

According to an aspect of the invention, an image forming apparatus includes:

an external storage device insertion detecting section that detects that an external storage device is inserted;

an automatic printing information searching section that searches automatic printing information defined to execute a printing process from information stored in the inserted external storage device;

an image information generating section that generates image information page by page from the automatic printing information searched by the automatic printing information searching section;

an identification information generating section that generates identification information to identify the corresponding image information from the image information generated page by page by the image information generating section;

an identification information comparing section that acquires previous identification information, which is previously generated by the identification information generating section, and that compares the acquired previous identification information with the identification information generated by the identification information generating section; and a printing executing section that executes a printing process for the image information corresponding to the generated identification information if a result of the comparison by the identification information comparing section indicates that the generated identification information does not match the previous identification information.

BRIEF DESCRIPTION OF THE DRAWINGS

Embodiments of the invention will be described in detail based on the following figures, wherein.

DETAILED DESCRIPTION

[First Embodiment](Configuration of Image Forming Apparatus)

Figure 1:
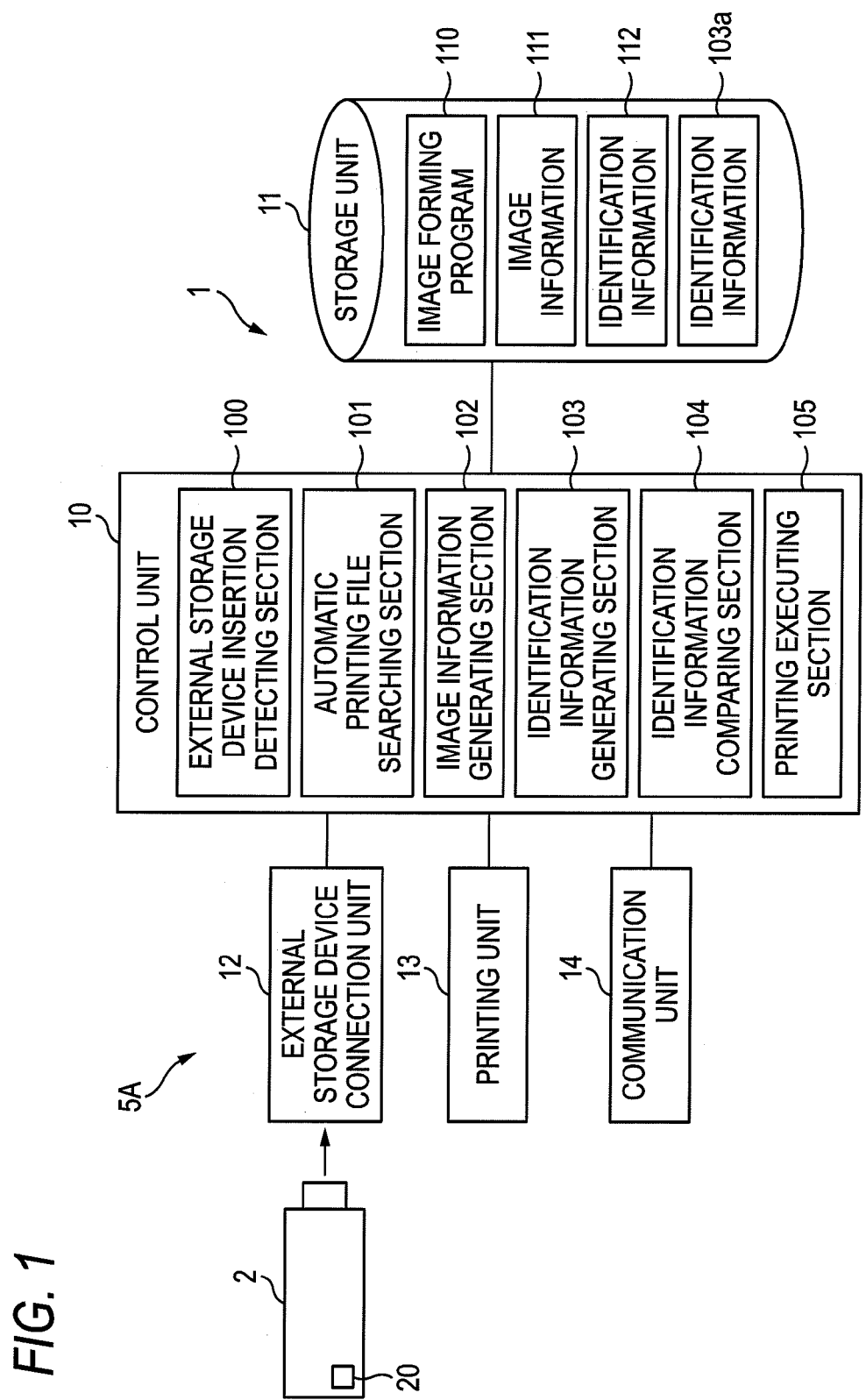
FIG. 1 is a schematic view showing an exemplary configuration of an image forming system according to a first embodiment.

FIG. 1 is a block diagram showing an exemplary configuration of an image forming apparatus 1.

An image forming apparatus 1 includes a control unit 10, such as a central processing unit (CPU), which controls each of the unit and executes various kinds of programs, a storage unit 11 having a storage medium, which stores information such as a hard disk drive (HDD), or a flash memory, an external storage device connection unit 12 including a connection terminal, which is connected with a USB memory 2, a universal serial bus (USB) controller and the like, a printing unit 13 which prints on paper using xerography or the like, and a communication unit 14 which transmits and receives information in communication with an external network. The image forming apparatus 1 may further include an operation unit, such as a keyboard, a touch panel or the like, which generates operation signals upon being operated.

By executing an image forming program 110, which will be described later, the control unit 10 functions as an external storage device insertion detecting section 100, an automatic printing file searching section 101, an image information generating section 102, an identification information generating section 103, an identification information comparing section 104, a printing executing section 105 and the like.

The external storage device insertion detecting section 100 detects the USB memory 2 inserted in the external storage device connection unit 12.

The automatic printing file searching section 101 searches an automatic printing file 20 defined to start a printing process in advance from information stored in the USB memory 2.

The image information generating section 102 generates image information 111 required by the control unit 10 in order to perform a printing operation in the printing unit 13 from the automatic printing file 20 page by page.

The identification information generating section 103 generates identification information 103a, which specifies the image information 111 generated by the image information generating section 102, page by page. Examples of the identification information 103a may include hash by MD5, SHA1 or the like, checksum, data or its size after being converted by compression or the like, a difference from reference data such as annotation or the like included in an image, the image information 111 itself, and the like. In addition, if a character string generated upon updating content such as revision information and the like is included in a file name of the automatic printing file 20, the identification information 103a may be generated from the file name.

The identification information comparing section 104 compares the identification information 103a generated, page by page, by the identification information generating section 103 with identification information 112 which was previously generated, page by page, by the identification information generating section 103 and was stored in the storage unit 11.

The printing executing section 105 executes a printing process in the printing unit 13 for a page with mismatch of the identification information 103a with the identification information 112, as a result of the comparison by the identification information comparing section 104, based on the image information 111 of the page.

The storage unit 11 stores the image forming program 110 to cause the control unit 10 to operate as the above-described section 100 to 105, the image information 111 generated by the image information generating section 102, the identification information 112 which was previously generated by the identification information generating section 103, the identification information 103a which is temporarily generated by the identification information generating section 103, and the like.

The USB memory 2 is an external storage device for the image forming apparatus 1 and stores the above-mentioned automatic printing file 20 and other files (not shown). The external storage device may be any form of connection of storage device without being limited to a USB memory. In addition, the form of connection may be either wired or wireless.

(Operation of Image Forming Apparatus)

Hereinafter, as an example of operation of the image forming apparatus 1, (1) basic operation and (2) automatic printing operation will be described with reference to FIGS. 1 to 3.

(1) Basic Operation

First, a user operates word processing software, spread sheet software, image processing software and the like on a personal computer (hereinafter referred to as a PC) or the like to prepare document information.

Next, the user moves or copies the document information prepared using the PC to the USB memory 2 connected to the PC.

Next, the user takes the USB memory 2 out of the PC and inserts it into a connection terminal of the external storage device connection unit 12 of the image forming apparatus 1.

(2) Automatic Printing Operation

Figure 3:
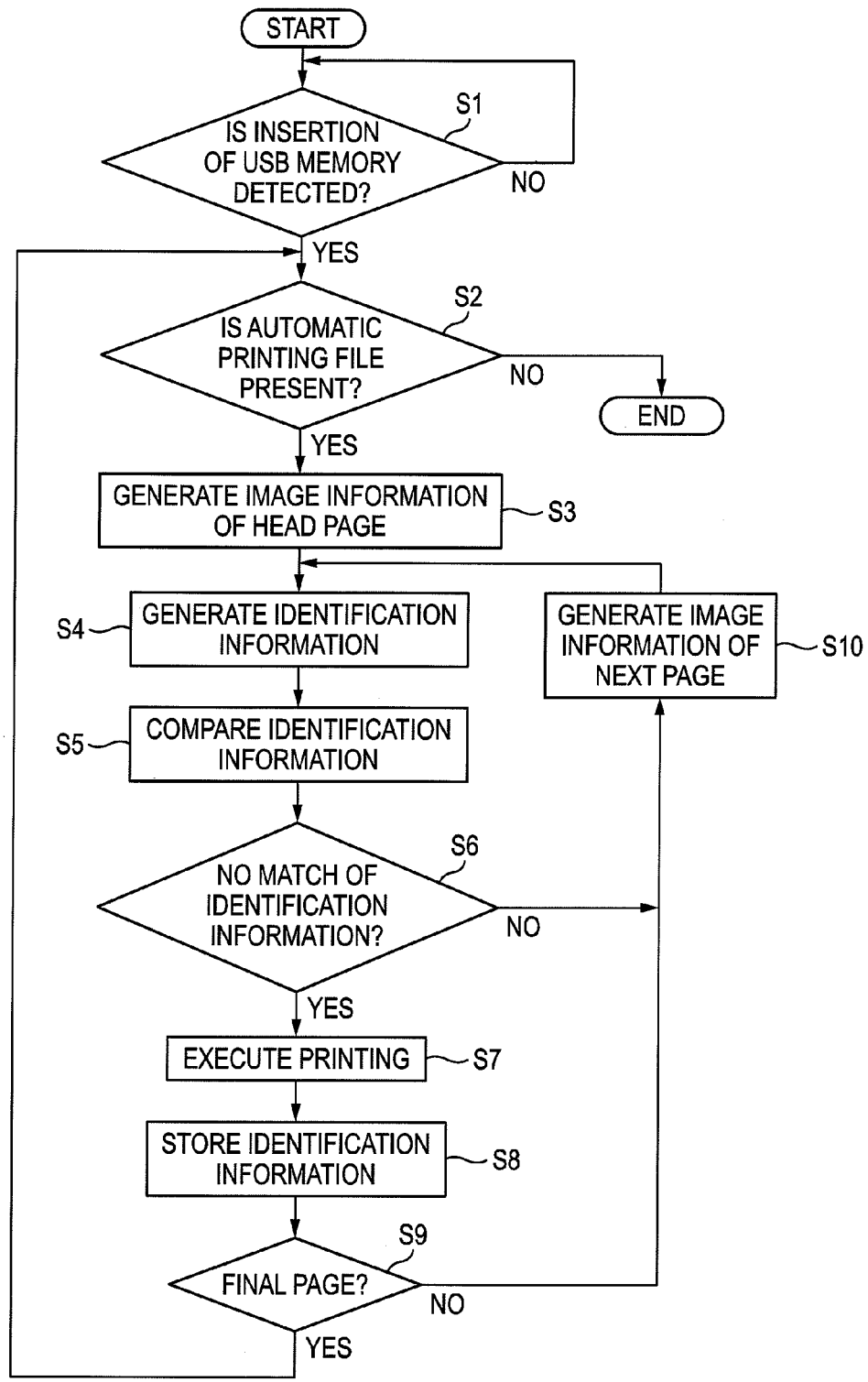
FIG. 3 is a flow chart illustrating an exemplary operation of an image forming apparatus.

FIG. 3 is a flow chart illustrating an exemplary operation of the image forming apparatus 1.

First, the external storage device insertion detecting section 100 detects insertion of the USB memory 2 into the external storage device connection unit 12 (Yes in S1) and informs the automatic printing file searching section 101 that the insertion of the USB memory 2 is detected.

The automatic printing file searching section 101 searches the automatic printing file 20 defined to be automatically printed from information stored in the connected USB memory 2 (S2).

Next, if the automatic printing file 20 is present (Yes in S2), the image information generating section 102 generates the image information 111 of a head page of the automatic printing file 20 (S3).

Next, the identification information generating section 103 generates the identification information 103a page by page from the image information 111 of the head page generated by the image information generating section 102 (S4).

Next, the identification information comparing section 104 compares the identification information 103a generated page by page by the identification information generating section 103 with the identification information 112 which was previously generated and stored in the storage unit 11 (S5).

As a result of the comparison by the identification information comparing section 104, if the identification information 103a does not match the identification information 112 (Yes in S6), the printing executing section 105 executes a printing process in the printing unit 13 using the image information 111 of the page (S7).

When the printing executing section 105 executes the printing process, the identification information generating section 103 stores the temporarily generated identification information 103a as the printing-complete identification information 112 (S8).

Next, if the page processed in Steps S4 to S8 is not a final page (No in S9), the image information generating section 102 generates the image information 111 of the next page (S10) and Steps S4 to S8 are similarly repeated for the next page.

If Steps S3 to S10 for all automatic printing files 20 are executed (No in S2), the operation is ended.

Figure 2A:
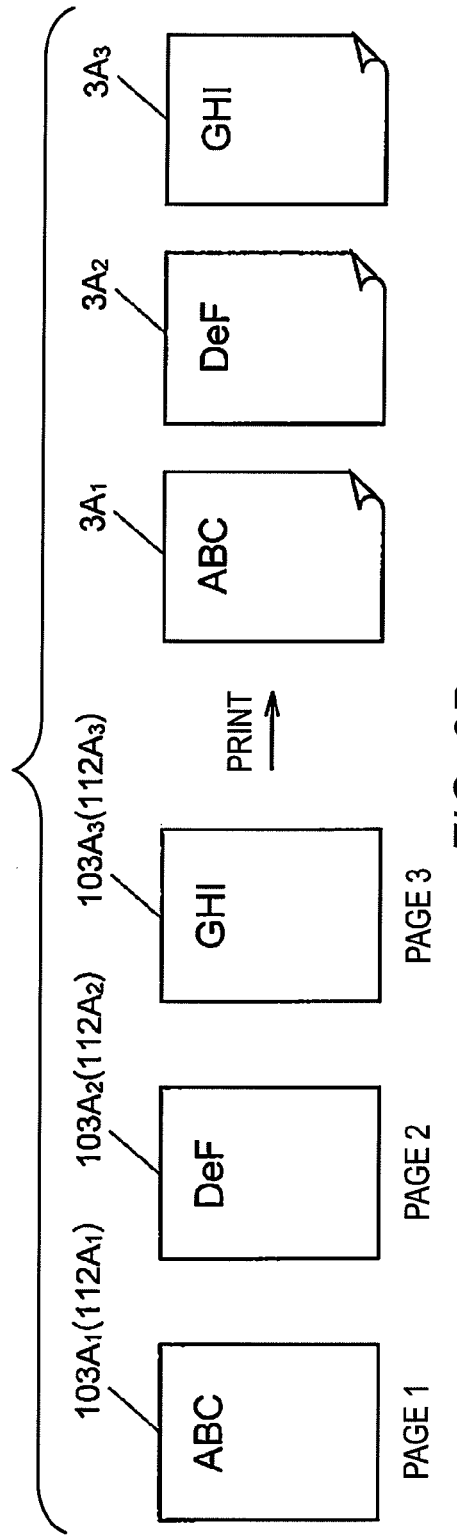
FIGS. 2A and 2B are schematic views for explaining an operation of an image forming apparatus.
Figure 2B:
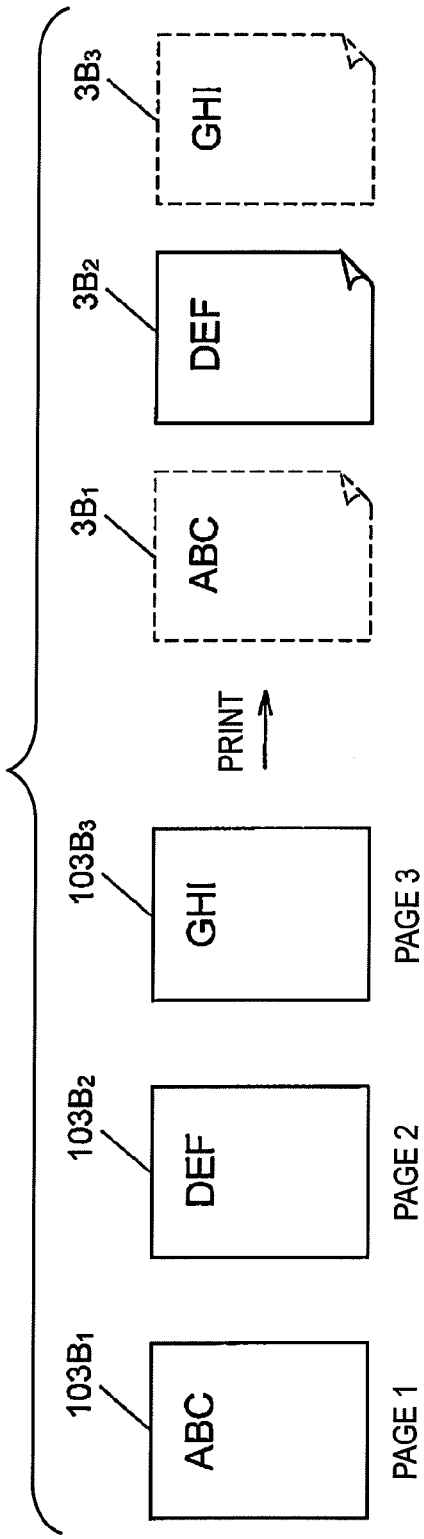

From the above operation, a relationship between the identification information 112 and the printing object is as shown in FIGS. 2A and 2B. FIGS. 2A and 2B are schematic views for explaining the operation of the image forming apparatus 1.

As shown in FIG. 2A, if it is determined in Step S6 of FIG. 3 that identification information 112 matching the identification information $103A_1$ to $103A_3$ is not present at all (Yes in S6), the printing executing section 105 prints all the pages as described in Step S7 and outputs the printing object $3A_1$ to $3A_3$. The identification information $103A_1$ to $103A_3$ is stored as identification information $112A_1$ to $112A_3$ as described in Step S8.

Thereafter, as shown in FIG. 2B, if it is determined in Step S6 that the identification information $103B_2$ of the identification information $103B_1$ to $103B_3$ does not match the identification information $112A_2$, the printing executing section 105 prints the printing object $3B_2$ for page 2 without printing the printing object $3B_1$ and $3B_3$ for pages 1 and 3.

[Second Embodiment]

Figure 4:
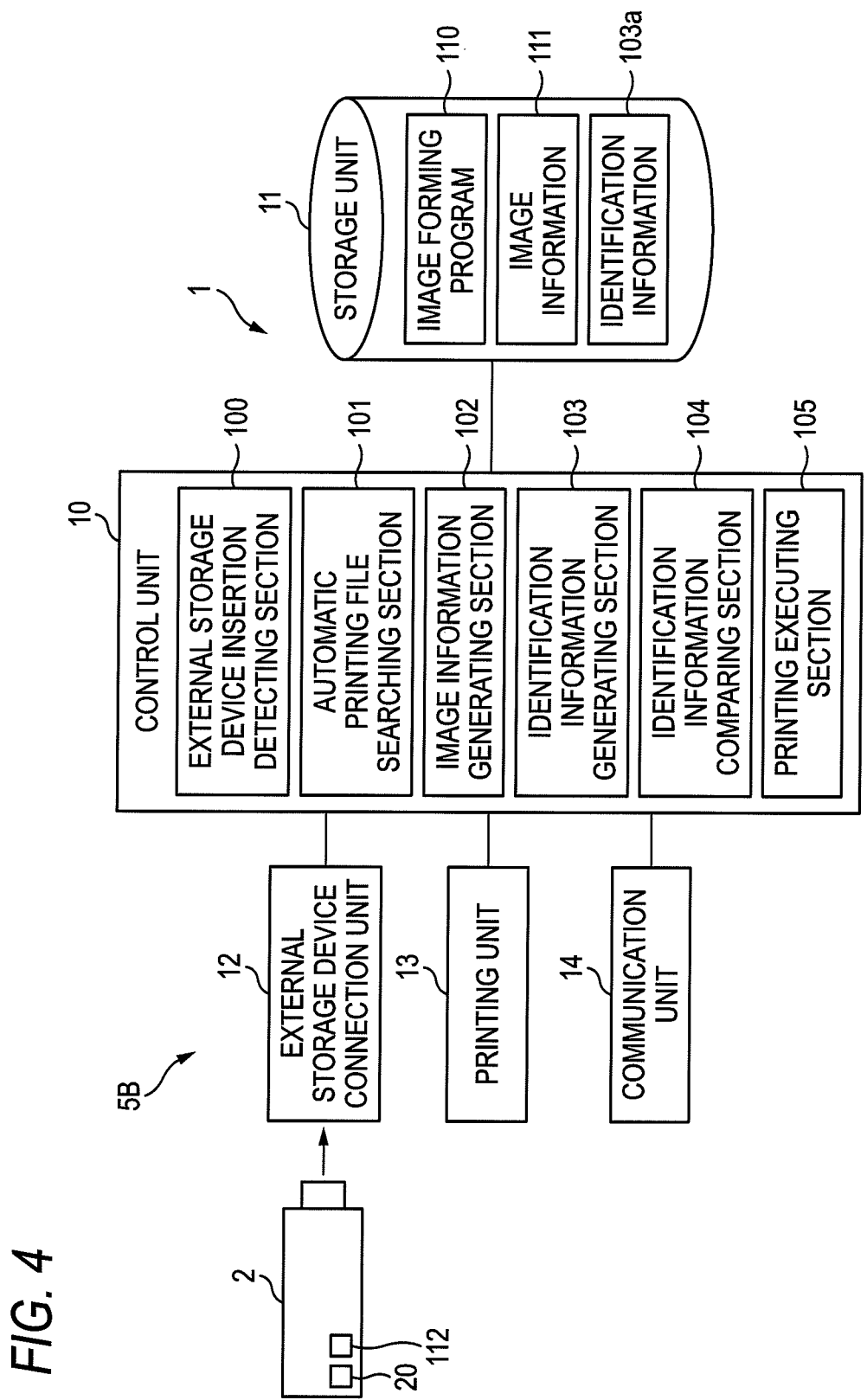
FIG. 4 is a schematic view showing an exemplary configuration of an image forming system according to a second embodiment.

FIG. 4 is a schematic view showing an exemplary configuration of an image forming system according to a second embodiment.

An image forming system 5B of the second embodiment is different from the image forming system 5A of the first embodiment in that the identification information 112 of the image information which was previously printed is stored in the USB memory 2 instead of the storage unit 11 of the image forming apparatus 1. In addition, the identification information 103a which is temporarily generated by the identification information generating section 103 may be either stored in the storage unit 11 or temporarily stored in the USB memory 2.

With the above configuration, the image forming apparatus 1 does not require any region in the storage unit 11 to store the identification information 112. In addition, in a case where a plurality of image forming apparatuses 1 are present, even if any image forming apparatus 1 is used, the identification information comparing section 104 of the image forming apparatus 1 for executing the printing process compares the identification information 112 stored in the USB memory 2 with the identification information 103a generated by the identification information generating section 103, thereby preventing duplicate printing.

[Third Embodiment]

Figure 5:
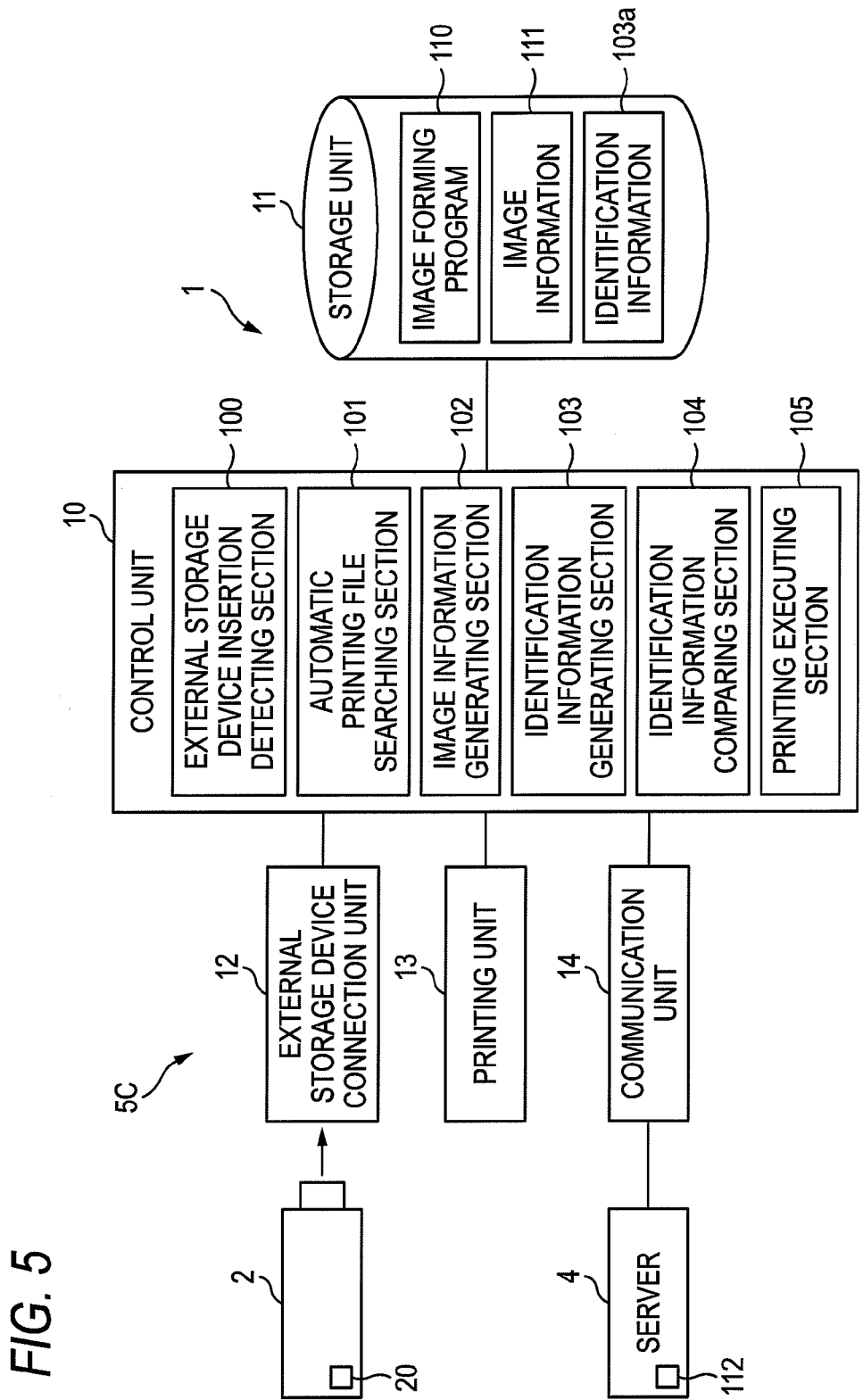
FIG. 5 is a schematic view showing an exemplary configuration of an image forming system according to a third embodiment.

FIG. 5 is a schematic view showing an exemplary configuration of an image forming system according to a third embodiment.

An image forming system 5C of the third embodiment is different from the image forming system 5A of the first embodiment in that the identification information 112 of the image information which was previously printed is stored in an external server 4, which presents on a network connected via the communication unit 14, instead of the storage unit 11 of the image forming apparatus 1. In addition, the identification information 103a which is temporarily generated by the identification information generating section 103 may be either stored in the storage unit 11 or temporarily stored in the server 4.

With the above configuration, the image forming apparatus 1 does not require any region in the storage unit 11 and the USB memory 2 to store the identification information 112. In addition, in a case where a plurality of image forming apparatuses 1 and USB memories 2 are present, even if any image forming apparatus 1 and any USB memory 2 are used, the identification information comparing section 104 of the image forming apparatus 1 for executing the printing process compares the identification information 112 stored in the server 4 with the identification information 103a generated by the identification information generating section 103, thereby preventing duplicate printing.

[Other Embodiments]

The present invention is not limited to the above-described embodiments and may be modified in various ways without departing from the spirit and scope of the invention.

In addition, the image forming program 110 may be stored in a storage medium such as a CD-ROM or the like or may be downloaded from a server connected to a network such as the Internet or the like to the storage unit of the apparatus. In addition, all or some of the external storage device insertion detecting section 100, the automatic printing file searching section 101, the image information generating section 102, the identification information generating section 103, the identification information comparing section 104 and the printing executing section 105 may be implemented by hardware such as an ASIC. In addition, the order of the steps in the description of the operation of the above embodiments may be changed, some of the steps may be omitted or new steps may be added.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an external storage device insertion detecting section that detects that an external storage device is inserted;
   an automatic printing information searching section that searches automatic printing information defined to execute a printing process from information stored in the inserted external storage device;
   an image information generating section that generates image information page by page from the automatic printing information searched by the automatic printing information searching section;
   an identification information generating section that generates identification information to identify the corresponding image information from the image information generated page by page by the image information generating section;
   an identification information comparing section that acquires previous identification information, which is previously generated by the identification information generating section, and that compares page by page, the acquired previous identification information with the identification information generated by the identification information generating section; and
   a printing executing section that executes a printing process only for the image information corresponding to the generated identification information if a result of the comparison by the identification information comparing section indicates that the generated identification information does not match the previous identification information.

2. The image forming apparatus according to claim 1, wherein, when the printing executing section executes the printing process for the image information, the identification information generating section stores the identification information corresponding to the image information as previous identification information.

3. The image forming apparatus according to claim 1, further comprising a storage section for storing the previous identification information which was previously generated by the identification information generating section.

4. A non-transitory computer readable medium storing a computer readable program executable by a computer for causing a computer to execute a process, the process comprising:
   detecting that an external storage device is inserted;
   searching automatic printing information defined to execute a printing process from information stored in the inserted external storage device;
   generating image information page by page from the automatic printing information searched by the searching;
   generating identification information to identify the corresponding image information from the image information generated page by page by the generating of the image information;
   acquiring previous identification information, which is previously generated by the generating of the identification information,
   comparing page by page, the acquired previous identification information with the identification information generated by the generating of the identification information; and
   executing a printing process only for the image information corresponding to the generated identification information if a result of the comparison by the comparing indicates that the generated identification information does not match the previous identification information.

5. An image forming system comprising:
   an external storage device which stores automatic printing information defined to execute a printing process and previous identification information which is previously generated; and
   an image forming apparatus which detects that the external storage device is inserted, searches the automatic printing information from the information stored in the inserted external storage device, generates image information page by page from the searched automatic printing information, generates identification information to identify the corresponding image information from the image information generated page by page, acquires the previous identification information from the external storage device, compares page by page the acquired previous identification information with the generated identification information, and prints only the image information corresponding to the generated identification information if a result of the comparison indicates that the generated identification information does not match the previous identification information.

6. The image forming system according to claim 5, wherein the image forming apparatus stores the identification information corresponding to the image information, as the previous identification information, in the external storage device when executing the printing process for the image information.

7. An image forming system comprising:
   an external server which stores previous identification information which is previously generated;
   an external storage device which stores automatic printing information defined to execute a printing process; and
   an image forming apparatus which detects that the external storage device is inserted, searches the automatic printing information from the information stored in the inserted external storage device, generates image information page by page from the searched automatic printing information, generates identification information to identify the corresponding image information from the image information generated page by page, acquires the previous identification information from the external server which is communicatively connected, compares page by page the acquired previous identification information with the generated identification information, and prints only the image information corresponding to the generated identification information if a result of the comparison indicates that the generated identification information does not match the previous identification information.

8. The image forming system according to claim 7, wherein the image forming apparatus stores the identification information corresponding to the image information, as the previous identification information, in the server when executing the printing process for the image information.

9. An image forming apparatus comprising:
   an image information generating section that generates image information page by page from printing information;
   an identification information generating section that generates identification information to identify the corresponding image information from the image information generated page by page by the image information generating section;
   an identification information comparing section that acquires previous identification information, which is previously generated by the identification information generating section, and that compares page by page, the acquired previous identification information with the identification information generated by the identification information generating section; and
   a printing executing section that executes a printing process only for the image information corresponding to the generated identification information if a result of the comparison by the identification information comparing section indicates that the generated identification information does not match the previous identification information.

\* \* \* \* \*